United States Patent Office 3,454,564
Patented July 8, 1969

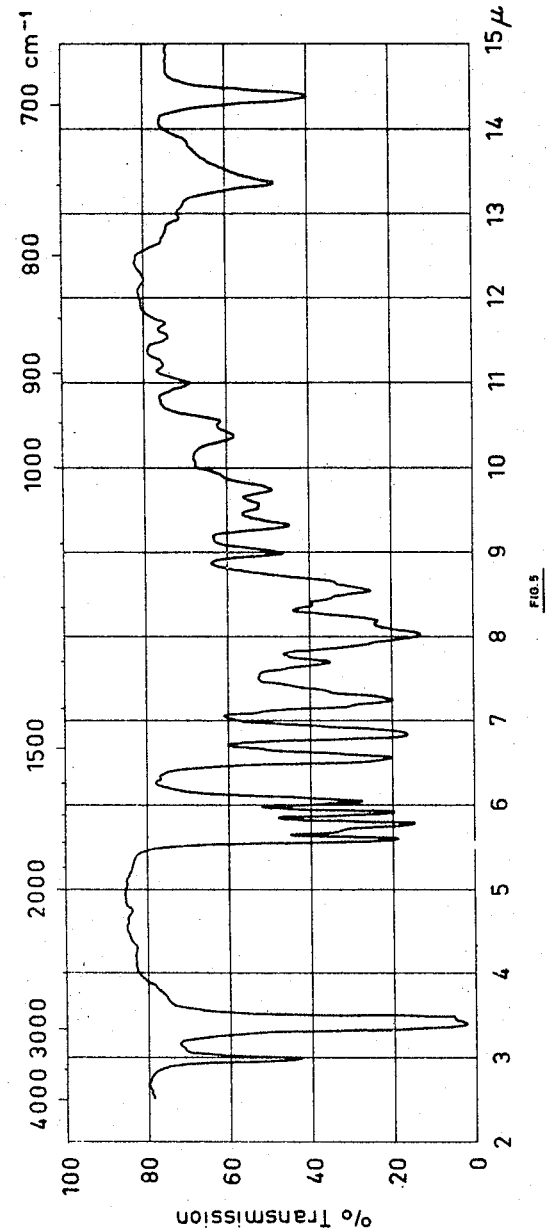

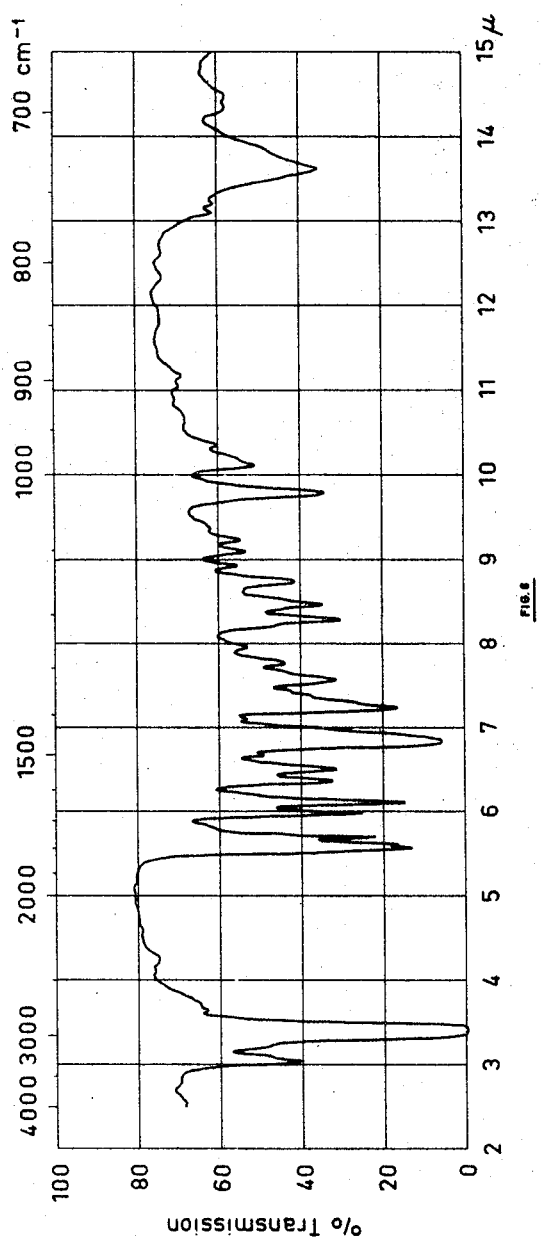

---

3,454,564
THERAPEUTICALLY ACTIVE DERIVATIVES OF 7-AMINO-CEPHALOSPORANIC ACID AND PROCESS FOR THE MANUFACTURE OF 7-AMINO-CEPHALOSPORANIC ACID
Ernst Vischer, Basel, and Bruno Fechtig and Hans Bickel, Binningen, Switzerland, assignors to Ciba Corporation, New York, N.Y., a corporation of Delaware
Filed July 25, 1962, Ser. No. 212,314
Claims priority, application Switzerland, July 25, 1961, 8,762/61; Dec. 22, 1961, 14,842/61; June 22, 1962, 7,536/62
Int. Cl. C07d 99/24; A61k 21/00
U.S. Cl. 260—243         17 Claims

ABSTRACT OF THE DISCLOSURE

The present invention concerns the manufacture of therapeutically active derivatives of cephalosporanic acid and their salts. It is also concerned with the process for the manufacture of 7-amino-cephalosporanic acid and of its lactone.

---

Figure 1:
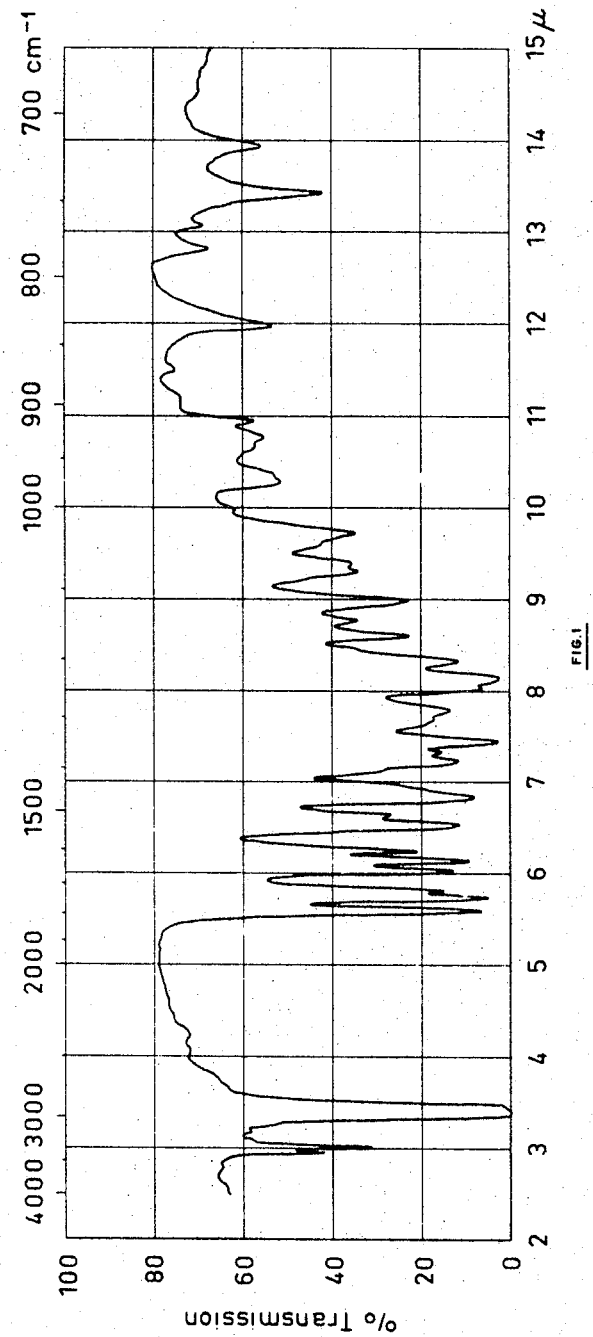

The present invention relates to a process for the manufacture of therapeutically active derivatives of cephalosporanic acid and their salts and a new advantageous process for the manufacture of 7-amino-cephalosporanic acid of the formula

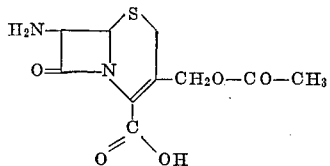

and of its lactone of the formula

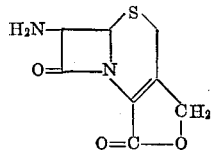

The new therapeutically active derivatives of 7-amino-cephalosporanic acid have the formula

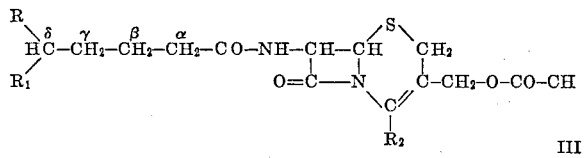

in which R represents a free or substituted amino group, $R_1$ a functionally converted corboxyl group and $R_2$ a free or functionally converted carboxyl group; in the thiazine ring the substituent in the 3-position may also be closed with $R_2$ to the lactone ring as in Formula II.

A substituted amino group is more especially an amino group substituted by an aryl or acyl radical. Aryl radicals are particularly nitro- or amino-substituted phenyl radicals, for example the 2:4-dinitrophenyl and 2:4:6-trinitrophenyl radical as well as the 2:4-diaminophenyl and 2:4:6-triaminophenyl radical. Acyl radicals are, for example such as are derived from benzenecarboxylic acids, primarily nitro- or amino-substituted benzenecarboxylic acids, for example 4-nitrobenzoic, 2:4-dinitrobenzoic or 2-amino-benzoic and 2:4-diaminobenzoic acid; further, especially derivatives of carbonic acid or thiocarbonic acid, particularly the tertiary butyloxycarbonyl radical, and radicals of carbamic or thiocarbamic acid of the formula

in which X represents oxygen or sulfur and $R_3$ represents hydrogen, acyl, especially lower alkanoyl, or a lower alkyl or aryl radical, particularly an unsubstituted phenyl or toluyl radical or a phenyl or toluyl radical substituted by one or more nitro or amino groups or halogen atoms, the carbamic acid radical or thiocarbamic acid radical forming together with the carbonyl group of $R_1$ an imidazolidine ring of the formula

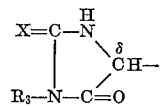

in which X represents oxygen or sulfur.

The functionally converted carboxyl group $R_1$ or $R_2$ are carboxylic acid amides, and more especially carboxylic acid esters. When $R_2$ is not a free carboxyl group, it is advantageously identical with $R_1$. The hydroxy component of the ester may be an alcohol or a phenol. As alcohols there come into consideration more especially lower alkanols, for example methanol, ethanol, propanol, butanol and unsubstituted or ring-substituted phenyl-lower alkanols for example benzyl alcohol, para-nitrobenzyl alcohol. The phenyl radicals of the esters are unsubstituted or substituted, particularly by nitro groups, for example the para-nitrophenyl radical.

The salts of the new derivatives are either acid addition salts, when R represents a free amino group, or metal salts or salts with organic bases when $R_2$ represents a free carboxyl group. Acid addition salts are, for example such with hydrochloric acid or hydrobromic acid, nitric acid, thiocyanic acid, sulfuric acid, phosphoric acid, or with an organic acid, such as acetic acid, propionic acid, glycollic acid, lactic acid, pyruvic acid, oxalic acid, malonic acid, succinic acid, maleic acid, fumaric acid, tartaric acid, citric acid, benzoic acid, cinnamic acid, salicylic acid, 2-phenoxybenzoic acid or 2-acetoxy-benzoic acid, mandelic acid, methanesulfonic acid, ethanesulfonic acid, hydroxyethanesulfonic acid, benzenesulfonic acid or toluenesulfonic acid.

Metal salts are advantageously such of therapeutically useful alkali metals or alkaline earth metals, such as sodium, potassium or calcium.

The new compounds of Formula III and their salts have an antibacterial activity, for example against gram-positive bacteria, such as *Bacillus subtilis*, *Bacterium megatherium* and *Staphylococcus aureus*, and more particularly against strains that are resistant to penicillin. Accordingly, they may be used as medicaments in human and veterinary medicine or as additives to animal feedstuffs. Particularly valuable is 7-[4-(1-phenyl-2-thiono-5-oxo-imidazolidine-4-yl)-butyrl]amino - cephalosproanic acid.

It has also been found that the new compounds may be used advantageously for the manufacture of 7-amino-cephalosporanic acid of Formula I and its lactone of Formula II. By hydrolysing the said compounds 7-amino-cephalosporanic acid is obtained in better yield than according ot the hitherto known processes.

Hydrolysis to form 7-amino-cephalosporanic acid, its salts or conversion products is preferably carried out in the presence of an acidic catalyst in a solvent or mixture of solvents, for example a lower alkanol, dioxane, acetonitrile, tetrahydrofuran or a mixture thereof. As acidic catalyst there come into consideration, for example, strong organic or inorganic acids, such, for example, as hydrochloric acid, sulfuric acid, toluene-sulfuric acid, polyphosphoric acid or a strong acidic ion exchange resin. The reaction is performed at room temperature, if necessary at a slightly raised temperature, but preferably at a lower temperature and/or in the presence of an inert gas, such as nitrogen.

The new compounds of Formula III are obtained by methods in themselves known. For example, they are obtained by functionally converting the carboxyl groups, if desired with ring closure, in a compound of the formula

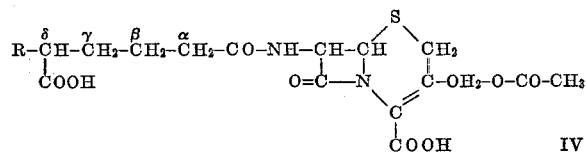

in which R represents a substituted amino group, and, if desired, in resulting products, which contain a 5-membered ring in the γ-position of the side-chain, converting the functionally converted carboxyl group in the 4-position of the thiazine ring into a free carboxyl by hydrolysis or hydrogenolysis, and, if desired, converting a substituted amino group into the free amino group.

The functional conversion of the carboxyl groups by conversion of the carboxyl group into an ester or amide or by ring-closure to form the imidazolidine ring is performed according to known methods, for example, by reacting the starting material with the corresponding alcohol or amine in the presence of a condensing agent, for example a mineral acid or a carbodiimide, or by reaction with a halide in the presence of a condensing agent, for example with benzyl chloride and tributylamine, or, particularly in the case of the alkyl ester, by reaction with a corresponding diazo compound, for example a diazo-lower alkane, such as diazomethane or diazobutane, or phenyldiazomethane.

The conversion of the ester group $R_2$ into a free carboxyl group is performed by means of an acidic or alkaline hydrolysing agent or, in the case of a hydrogenolytically splittable ester group, preferably hydrogenolytically, for example when $R_2$ is a group esterified with free or substituted benzylalcohol. Hydrogenolysis is carried out, for example, with hydrogen in the presence of a noble metal catalyst, for example palladium black.

The conversion of a substituted amino group into a free amino group is performed by means of hydrolysis or hydrogenolysis according to the methods especially known in peptide chemistry.

Taking into consideration the sensitivity of cephalosporin and its derivatives, the aforementioned reactions should be carried out only under mild conditions, advantageously in the presence of a diluent or solvent, for example an alcohol, such as methanol or ethanol, a ketone such as acetone, an ether, such as diethyl ether, tetrahydrofuran or dioxane, a glycoldimethyl ether or a halogenated hydrocarbon, such as chloroform or methylene chloride and/or a condensing agent. The reactions are carried out at room temperature, if necessary at a slightly higher but preferably at a lower temperature and/or in the presence of an inert gas, such as nitrogen.

The starting materials of Formula IV are known or may be prepared in a manner known per se. For example, compounds of the Formula IV, in which R represents an amino group substituted by an aryl radical, particularly a nitrophenyl radical, or aminophenyl radical, are obtained by reacting cephalosporin C with an aryl halide, for example with dinitrofluoro-benzene, and, if desired, reducing the nitro groups to amino groups. Compounds of the Formula IV, in which R represents an acylamino group, are obtained by acylating the δ-amino group of cephalosporin C by reaction with an acid or a functional derivative thereof, such as an acid halide, ester, particularly an activated ester, azide, pure or mixed anhydrides, for example mixed anhydrides with carbonic acid monoalkyl esters, such as carbonic acid monoethyl or isobutyl esters. Starting materials of the Formula IV in which R represents an amino group substituted by a radical of the formula $$-C=X$$
$$HN-R_3$$

in which X and $R_3$ have the meanings given above, may be obtained, for example by reacting cephalosporin C with an isocyanic acid or isothiocyanic acid ester of the formula $R_3-N=C=X$ or by reaction with a salt, especially an alkali metal salt, of isocyanic acid or isothiocyanic acid.

The starting materials may be formed in the course of the reaction and need not be isolated in pure form. For example, the formation of the carbamic acid and thiocarbamic acid derivatives and their ring-closure to the aforementioned imidazolidine compounds may be effected in one step.

The new compounds may be used as medicaments, for example in the form of pharmaceutical preparations containing them or their salts in admixture or conjunction with an organic or inorganic, solid or liquid excipient suitable for enteral, parenteral or local administration. Suitable excipients are substances that do not react with the new compounds such, for example, as water, gelatine, lactose, starches, stearyl alcohol, magnesium stearate, talc, vegetable oils, benzyl alcohols, gums, propylene glycol, polyalkylene glycols, white petroleum jelly, cholesterol or any other known medicinal excipient. The pharmaceutical preparations may be for example, tablets, dragees, ointments, creams or capsules, or in liquid form as solutions, suspensions or emulsions. They may be sterilized and/or contain assistants such as preserving, stabilizing, wetting or emulsifying agents, solution promoters or salts for regulating the osmotic pressure or buffers. They may also contain other therapeutically valuable substances. The preparations are formulated by conventional methods.

The following examples illustrate the invention without limiting it thereto.

Example 1

A solution of 9.43 grams (20 mmols) of cephalosporin C in 250 cc. of N-sodium bicarbonate is mixed with a solution of 3.62 cc. (26 mmols) of tertiary butyloxycarbonyl azide in 150 cc. of dioxane and the mixture is stirred for 5 hours at 40° C. The solution is then concentrated to about 150 cc. at 30° C. under 0.5 mm. Hg, diluted with 200 cc. of water and repeatedly extracted with ethyl acetate. The aqueous phase is saturated with sodium chloride and then exhaustively extracted with cold ethyl acetate at pH 2.0. The extract is washed with saturated sodium chloride solution, dried over sodium sulfate and evaporated under vacuum, to yield amorphous, colourless N-tertiary butyloxycarbonyl-cephalosporin C of the formula

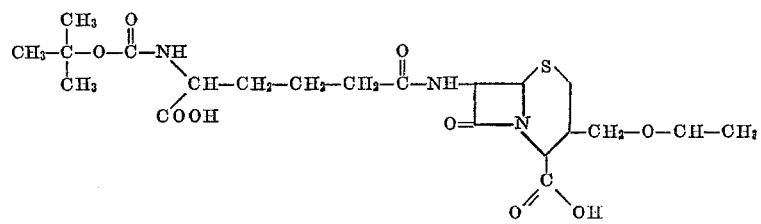

The product is identified by its paper chromatogram and antibacterial properties in the plate test (spot *b* in Table 1).

A solution of 1 gram of N-tertiary butyloxycarbonyl-cephalosporin C in 20 cc. of methanol is cooled to 0° C. and while being rotated mixed with 15 cc. of an ethereal diazomethane solution of 4% strength. After about 5 seconds the reaction is interrupted by adding 3 cc. of glacial acetic acid. The mixture is considerably concentrated under vacuum, taken up in 200 cc. of ethyl acetate, washed with N-sodium bicarbonate soltuion and with saturated sodium chloride solution, dried over sodium sulfate and evaporated under vacuum to yield the N-tertiary butyloxycarbonyl-cephalosporin C dimethyl ester as an amorphous, colourless residue. The product is unitary; it is identified by its paper chromatogram and the plate test (spot *c* in Table 1).

The diester may be hydrolysed to form 7-amino-cephalosporanic acid as follows:

(a) A solution of 125 mg. of N-tertiary butyloxycarbonylcephaolsporin C dimethyl ester in a mixture of 20 cc. of methanol and 0.16 cc. of concentrated hydrochloric acid is kept for 2½ days at 2° C., then concentrated to about 1 cc. at 30° C. under 0.5 mm. Hg pressure, taken up in 30 cc. of ethyl acetate and extracted with 30 cc. and then with 20 cc. of water. The aqueous phases are washed back with 20 cc. of ethyl acetate, combined and evaporated at 30° C. under 0.5 mm. Hg; they contain 76 mg. of basic and amphoteric constituents of the reaction mixture. A biautogram developed with *Staphylococcus aureus* displays a spot *p* (Table 1) whose biological activity increases considerably when sprayed with phenylacetyl chloride reagent. (The paper chromatogram is sprayed first with 1-molar pyridine in acetone+water 1:1, then with 1% phenylacetyl chloride solution in acetone, and finally once more with the pyridine solution.) This behaviour, which appears distinctly also in the plate test (Table 1), is typical of 7-amino-cephalosporanic acid and its N-unsubstituted derivatives and is due to their conversion into the N-phenylacetyl compounds which are about 100 times more active. The paper chromatogram developed with ninhydrin-collidine (mixture of 938 mg. of ninhydrin, 700 cc. of absolute alcohol, 210 cc. of glacial acetic acid and 28 cc. of collidine) displays in the same area in addition to blue, biologically inactive decomposition products (spots *o*, *q*, *r* and *s*) a grey-orange or brown spot *p* the colour of which likewise suggests a 7-amino-cephalosporanic acid. The active material migrates in the high-voltage paper electrophoresis at pH 4.5 towards the cathode and is therefore basic; after phenylacetylation on the paper and bioautographic development with *Staphylococcus aureus* one can detect two bases (spots *x* and *y*) whose faster migrating and more active component (spot *x*) is probably the cephalosporin C dimethyl ester or, respectively, desacetyl-cephalosporin C methyl ester lactone, while the more slowly migrating and less basic component (spot *y*) may be attributed either to 7-amino-cephalosporanic acid methyl ester or to desacetyl-7-amino-cephalosporanic acid lactone.

PAPER ELECTROPHORESIS

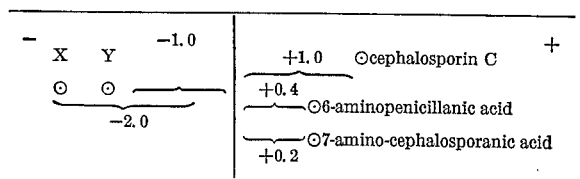

1½ hours, 2,000 volt, pH=4,5 (N-acetic acid-pyridine).

The neutral and acidic constituents of the reaction mixture turn up in the ethyl acetate extract which is dried over sodium sulfate and evaporated under vacuum. The paper chromatogram of the residue (41 mg.) reveals that it contains probably unreacted starting material (spot *c*).

(b) 100 mg. of N-tertiary butyloxycarbonyl-cephalosporin C dimethyl ester are taken up in 5 cc. of trifluoroacetic acid and after one minute evaporated under vacuum. Working up as described in Example 1 yields 10 mg. of an ethyl acetate extract (starting material spot *c* in Table 1) and 104 mg. of evaporation residue of the aqueous phase. The paper chromatogram of the latter, developed with ninhydrincollidine, displays in addition to a very minor spot *q* a strong spot *s*, that is ascribed to cephalosporin C dimethyl ester. In the bioautogram the spot *p* (7-amino-cephalosporanic acid type) becomes slightly visible.

Example 2

A solution of 49 mg. of N-tertiary butyloxycarbonyl-cephalosporin C in 10 cc. of methanol is ethylated with 5 cc. of an ethereal diazoethane solution of about 5% strength. After 5 seconds the mixture is mixed with 2 cc. of glacial acetic acid and then worked up as described in Example 1 for the manufacture of the dimethyl ester. The resulting product is the N-tertiary butyloxycarbonyl-cephalosporin C diethyl ester of the formula

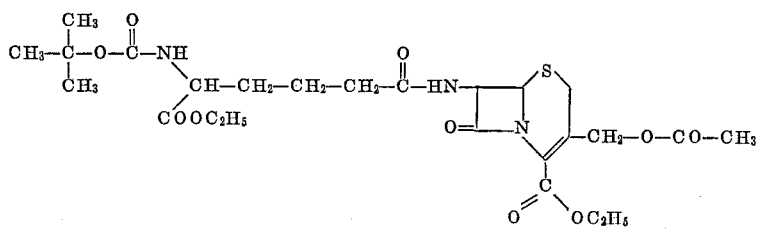

The unitary substance is identified by its paper chromatogram, and the plate test (spot *d* in Table 1).

The ethylation may be carried out, for example, with ethanol instead of methanol as solvent.

The diethyl ester is hydrolysed in the same manner as the dimethyl ester (Example 1) to form 7-amino-cephalosporanic acid.

Example 3

A solution of 60 mg. of N-tertiary butyloxycarbonyl-cephalosporin C in 10 cc. of methanol is butylated with 5 cc. of a solution of 1-diazobutane in ether as described above under (a) and then worked up, to yield unitary, amorphous N-tertiary butyloxycarbonyl-cephalosporin C di-n-butyl ester. It is identified by its paper chromatogram and the plate test (spot *e* in Table 1).

The butylation can be carried out, for example, with n-butanol instead of methanol as solvent.

The dibutyl ester is hydrolysed in the same manner as the dimethyl ester (Example 1) to form 7-amino-cephalosporanic acid.

Example 4

1 gram of N-2:4-dinitrophenyl-cephalosporin C is methylated as described in Example 1 for the manufacture of the dimethyl ester, to yield amorphous, yellow N-2:4-dinitrophenyl-cephalosporin C dimethyl ester of the formula

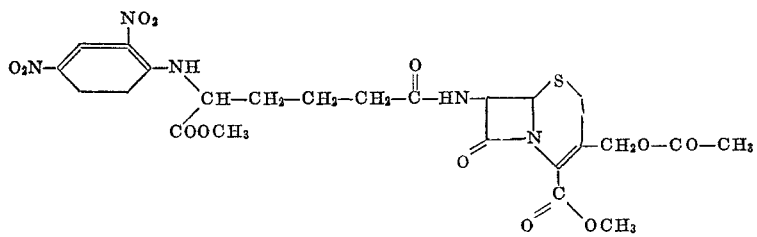

which is identified by its paper chromatogram and the plate test (spot g in Table 1).

The compound may be hydrolysed as follows:

(a) 140 mg. of N-2:4-dinitrophenyl-cephalosporin C dimethyl ester are hydrolysed in 20 cc. of methanol with 0.16 cc. of concentrated hydrochloric acid for 2½ days at 0° C. and then worked up as described in Example 1. The product is identified by its paper chromatogram and plate test (spot g in Table 1).

(b) 101 mg. of N-2:4-dinitrophenyl-cephalosporin C dimethyl ester are hydrolysed in 20 cc. of methanol+ether 3:1 with 0.4 cc. of concentrated hydrochloric acid for 18 hours at 22° C., and the reaction mixture is worked up as described in Example 1. Identification by paper chromatogram and plate test (see Table 1).

(c) 99 mg. of N-2:4-dinitrophenyl-cephalosporin C dimethyl ester are hydrolysed as described in Example 4b with 0.5% of hydrochloric gas in 20 cc. of methanol+ether 3:1 and then worked up. Identification by paper chromatogram and plate test (see Table 1).

(d) 300 mg. of N-2:4-dinitrophenyl-cephalosporin C dimethyl ester are hydrolysed in 30 cc. of methanol+dioxane 3:1 with 1.7 cc. of concentrated hydrochloric acid for 64 hours at 0° C., and then worked up as described in Example 1. Identification by paper chromatogram and plate test (see Table 1). The bioautogram of a high-voltage paper electrophoresis at pH 4.5 reveals only one active component which only becomes visible on treatment with phenylacetyl chloride reagent and corresponds to the spot y in the diagram (see Example 1) which travels a shorter distance.

(e) 300 mg. of N-2:4-dinitrophenyl-cephalosporin C dimethyl ester are hydrolysed with 30 cc. of a 3:1-mixture of methanol and dioxane containing 3% of hydrogen chloride gas as described in Example 11 and then worked up. Identification by paper chromatogram and plate test (see Table 1). The bioautogram of a high-voltage paper electrophoresis at pH 4.5 reveals only one active component which only becomes visible on treatment with phenylacetyl chloride reagent and corresponds to the spot y in the diagram (see Example 1) which travels a shorter distance.

Example 5

A solution of 1 gram of N-2: 4-dinitrophenyl-cephalosporin C in 20 cc. of methanol is reacted as described in Example 2 with an ethereal solution of diazoethane and then worked up, to yield amorphous, dark yellow N-2: 4-dinitrophenyl-cephalosporin C diethyl ester. Identification by paper chromatogram and plate test (spot h in Table 1).

For the ethylation it is possible to use, for example, ethanol instead of methanol as solvent.

(a) 121 mg. of the compound in 20 cc. of alcohol is hydrolysed and worked up as described in Example 4a. Identification by paper chromatogram and plate test (see Table 1).

(b) 145 mg. of N-2: 4-dinitrophenyl-cephalosporin C diethyl ester are hydrolysed in 20 cc. of alcohol plus ether 3:1 with 0.4 cc. of concentrated hydrochloric acid as described in Example 4b and then worked up. Identification by paper chromatogram and plate test (see Table 1).

(c) 146 mg. of N-2:4-dinitrophenyl-cephalosporin C diethyl ester are hydrolysed in 20 cc. of alcohol plus ether 3:1 with hydrochloric gas as described in Example 4c and then worked up. Identification by paper chromatogram and plate test (see Table 1).

(d) 300 mg. of N-2:4-dinitrophenyl-cephalosporin C diethyl ester are hydrolysed with 1.7 cc. of concentrated hydrochloric acid in 30 cc. of a 3:1-mixture of alcohol and dioxane as described in Example 4d and then worked up. Identification by paper chromatogram and plate test (see Table 1). The bioautogram of a high-voltage paper electrophoresis at pH 4.5 reveals only one active component which only becomes visible on treatment with phenylacetyl chloride reagent and corresponds to the spot y in the diagram (see Example 1) which travels a shorter distance.

(e) 300 mg. of N-2:4-dinitrophenyl-cephalosporin C diethyl ester are treated with 3% hydrogen chloride gas in a 3:1 mixture of alcohol and dioxane as described in Example 4e and then worked up. Identification by paper chromatogram and plate test (see Table 1). The bioautogram of a high-voltage paper electrophoresis at pH 4.5 reveals one active component which only becomes visible on treatment with phenylacetyl chloride reagent and corresponds to the spot y in the diagram (see Example 1) which travels a shorter distance.

Example 6

When a solution of 1 gram of N-2:4-dinitrophenyl-cephalosporin C in methanol is reacted with 1-diazobutane as described in Example 3 and the reaction product is worked up, there is obtained amorphous, dark-yellow N-2:4-dinitrophenyl-cephalosporin C-di-n-butyl ester. Identification by paper chromatogram and plate test (spot i in Table 1). Crystallisation from acetone plus ether yields orange needles combined in clusters which melt after recrystallisation at 103–104° C.

Combustion analysis. — $C_{30}H_{39}O_{12}N_5S$: Molecular weight, 693.75. Calculated: C, 51.94; H, 5.67; N, 10.10; S, 4.62%. Found: C, 52.21; H, 5.66; N, 10.99; S, 4.55%.

Infra-red absorption in Nujol: Bands at 5.62, 5.75, 5.82, 6.05, 6.15, 6.25, 6.55, 6.65 and 7.46μ (see FIG. 1).

Ultra-violet absorption spectrum in absolute alcohol: $\lambda_{max.}$ 262 mμ ($\epsilon_{max.}$=17,800); 341 mμ ($\epsilon_{max.}$=17,600). A solution of the crystals of 1% strength in acetone proves biologically inactive in the plate test (*Staphylococcus aureus, Bacillus subtilis*).

For the butylation it is possible to use for example ethanol instead of methanol as solvent; butanol gives poorer yields. The ester may be hydrolysed as follows:

(a) 210 mg. of crystalline N-2:4-dinitrophenyl-cephalosporin C di-n-butyl ester are hydrolysed in 20 cc. of n-butanol as described in Example 4 and then worked up. Identification by paper chromatogram and plate test (see Table 1) and as N-3:5-dinitrobenzoyl derivative.

985 mg. of the hydrolysate are taken up in 50 cc. of 0.3-molar phosphate buffer of pH 7.0 and mixed, while being stirred at 0° C., with 50 cc. of 3:5-dinitrobenzoyl chloride solution of 2.5% strength in acetone. By occasionally adding N-sodium bicarbonate solution the pH value is kept constant. The whole is left to itself for 1½ hours, then the acetone is evaporated, and the residue extracted with butanol plus ethyl acetate 1:1. The product (1.76 grams) is chromatographed on silica gel. The fractions eluted with chloroform are evaporated and give as residue desacetyl-7-(3:5-dinitrobenzoyl)-amino-cephalosporanic acid lactone. Thin-layer chromatogram on silica gel: Rf=0.42 in the system ethyl acetate after sprinkling with 2 N-sodium hydroxide solution. Infrared absorption spectrum in Nujol: Bands at 5.57, 5.68, 5.97, 6.12, 6.25, 6.45 and 7.41μ.

Example 7

60 mg. of N-phenylacetyl-cephalosporin C are taken up in 10 cc. of methanol and methylated with 5 cc. of diazomethane solution as described for the manufacture of the dimethyl ester in Example 1 and then worked up, to yield unitary N-phenylacetyl-cephalosporin C dimethyl ester of the formula

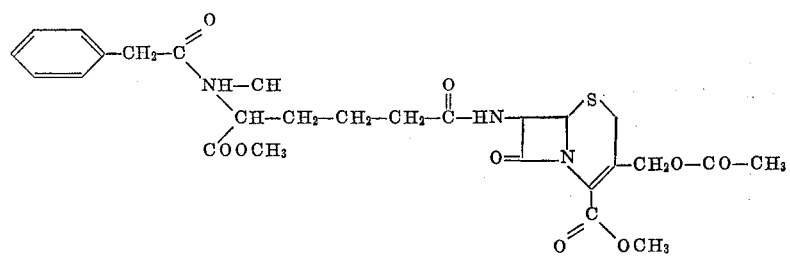

which is identified by its paper chromatogram and the plate test (see spot *l* in Table 1).

Ethylation of 50 mg. of N-phenylacetyl-cephalosporin C by the method described in Example 2 yields unitary N-phenylacetyl-cephalosporin C diethyl ester. Identification by paper chromatogram and plate test (see spot *m* in Table 1).

Butylation of 60 mg. of N-phenylacetyl-cephalosporin C as described in Example 3 yields unitary N-phenylacetyl-cephalosporin C di-n-butyl ester (see spot *n* in Table 1).

The compounds may be hydrolysed in an analogous manner to that described in the preceding examples.

Example 8

20 grams of cephalosporin C are dissolved in 500 cc. of N-sodium bicarbonate, treated with 200 cc. of acetone and then treated at 40°C. slowly and with vigorous stirring with a solution of 7.5 cc. of phenyl isothiocyanate in 200 cc. of acetone. After the reaction mixture has been stirred for 2 hours at 40° C., the acetone is evaporated under reduced pressure, the remaining aqueous phase is adjusted to pH 5.0 with phosphoric acid of 80% strength, extracted five times with 200 cc. of benzene each time (evaporation residue of the benzene extract dried with sodium sulfate: 499 mg.). The aqueous solution further acidified to pH 2.0 with phosphoric acid is finally extracted four times with 300 cc. of ethyl acetate each time. The extracts are washed with aqueous phosphoric acid of 1% strength and dried over sodium sulfate to yield 22.29 grams of residue. In the plate test it shows the following inhibition zones:

| | Staph. aureus (sensitive to penicillin G) (mm.) | Staph. aureus (resistant to penicillin G) (mm.) | Bac. subtilis (mm.) |
|---|---|---|---|
| 1% solution | 25 | 21 | 30 |
| 0.1% solution | 18 | 16 | 21 |
| 0.01% solution | 10 | 9 | 10 | and, according to the paper chromatogram (system: n-butanol - methanol - water 2:1:2, biautographed with *Staphylococcus aureus*) consists of a mixture of N-(N'-phenyl - thiocarbamyl) - cephalosporin C of the formula

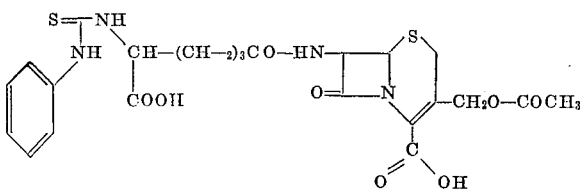

(Rf=0.68; strong spot) and 7-[4-(1-phenyl)-2-thiono-5-oxo - imidazolidine - 4-yl)-butyryl]-aminocephalosporanic acid (PTH-cephalosporin C) of the formula

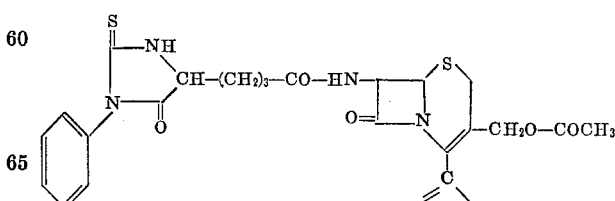

(Rf=0.78, weak spot).

The mixture is converted into the unitary imidazolidine derivative by acidic treatment as follows:

107 mg. of the mixture are dissolved in 5 cc. of glacial acetic acid and heated for 21 hours at 40°C. The reaction mixture is then evaporated under 0.1 mm. pressure of mercury and the remaining acetic acid removed by taking up the residue in a mixture of toluene and alcohol (2:1) and renewed evaporation to yield 95.6 mg. of paper - chromatographically unitary, crude 7 - [4-(1-phenyl)-2-thiono - 5 - oxo - imidazolidine-4-yl)-butyryl]-amino-cephalosporanic acid.

Inhibition zones in the plate test:

|  | Staph. aureus (sensitive to penicillin G) (mm.) | Staph. aureus (resistant to penicillin G) (mm.) | Bac. subtilis (mm.) |
| --- | --- | --- | --- |
| 0.1% solution | 20 | 18 | 24 |
| 0.01% solution | 12 | 11 | 13 |

In the dilution test the following inhibition concentrations are found:

|  | Staph. aureus (sensitive to penicillin G) ($\gamma$/ml.) | Staph. aureus (resistant to penicillin G) ($\gamma$/ml.) |
| --- | --- | --- |
| Mixture of substances before acidic treatment | 16 | 16 |
| PTH-cephalosporin C after acidic treatment | 8 | 16 |
| Cephalosporin C | 125 | 125 |

The substance may be further purified by chromatography on silica gel.

Example 9

A solution of 15 grams of cephalosporin C in 150 ml. of water and 150 ml. of pyridine (at pH 7.5) is heated to 37° C., and mixed with 11.9 ml. of N-sodium hydroxide solution (at pH 9.0). 7.5 ml. of phenyl isothiocyanate are then added, while keeping the temperature (37°C.) and the pH value (9) constant by dropping in N-sodium hydroxide solution, of which 60% of the calculated amount are consumed within the first 10 minutes. After 70 minutes, 71% of the theoretical amount of sodium hydroxide solution has been consumed. The mixture is diluted with 400 ml. of water and agitated 3 times with 1 litre of benzene on each occasion and once with 500 ml. of ether. The aqueous phase is then adjusted to pH 1.7 with concentrated hydrochloric acid, the precipitate being dissolved by adding 600 ml. of dioxane, and the whole is left to itself for 2½ hours at 22°C. The solution is slightly concentrated under vacuum and then again diluted with water and exhaustively extracted with ethyl acetate. The extracts are washed with saturated sodium chloride solution, dried over sodium sulfate and evaporated to yield 17.07 grams of residue. The colorless, amorphous 7 - [4 - (1 - phenyl - 2 - thiono - 5 - oxo - imidazolidine - 4 - yl) - butyryl] - amino - cephalosporanic acid is revealed by its paper-chromatogram (after biautographic development with Staphylococcus aureus) to be unitary and has in the system n - butanol:methanol: water (2:1:2) and Rf value of 0.68, and in the system n - butanol (saturated with water) glacial acetic acid (98:2) an Rf value of 0.41. Inhibition zones of 1% solutions in acetone on paper roundels of 6 mm. diameter: Staphylococcus aureus 24 mm; Bacillus subtilis 30 mm.; Staphylococcus aureus, resistant to penicillin, 21 mm. The esters are obtained by alkylation of this acid:

(a) 800 mg. of 7-[4-(1-phenyl-2-thiono-5-oxo-imidizolidine-4-yl)-butyryl] - amino - cephalosphoranic acid are taken up in 400 ml. of methanol and methylated with 40 ml. of a diazomethane solution of 5% strength and then worked up, as described for the manufacture of the dimethyl ester in Example 1. In this manner there is obtained unitary 7-[4-(1-phenyl-2-thion-5-oxo-imidazolidine-4-yl)-butyryl]-amino-cephalosporanic acid methyl ester.

(b) When 50 mg. of 7-[4-(1-phenyl-2-thiono-5-oxo-imidazolidine-4-yl)-butyryl]-amino-cephalosporanic acid are ethylated as described in Example 2, unitary 7-[4-(1-phenyl - 2 - thiono - 5 - oxo-imidazolidine-4-yl)-butyryl]-amino-cephalosporanic acid ethyl ester is obtained.

(c) When 60 mg. of 7-[4-(1-phenyl-2-thiono-5-oxo-imidazolidine-4-yl)-butyryl]-amino-cephalosporanic acid are butylated by the method described in Example 3, unitary 7 - [4-(1-phenyl-2-thiono-5-oxo-imidizaolidine-4-yl)-butyryl]-amino-cephalosporanic acid n-butyl ester is obtained.

The esters may be hydrolysed as described in Examples 1 to 7 to form 7-amino-cephalosporanic acid.

Example 10

A solution of 15 grams of N-2:4-dinitrophenyl-cephalosporin C in 600 ml. of absolute pyridine is mixed with 8 grams of para-nitrophenol and 20 grams of N:N'-dicyclohexyl carbodiimide and the mixture is kept for 14 hours at 22° C. The resulting crystalline dicyclohexyl urea (melting at 220°) is then filtered off and the filtrate is evaporated under vacuum. A solution of the residue in 1 liter of ethyl acetate is successively washed with 2 N-hydrochloric acid, water and saturated sodium chloride solution, dried over sodium sulfate and evaporated under vacuum; the residue is taken up in acetone and any further precipitated dicyclohexyl urea is filtered off. The evaporated filtrate (22.8 grams) is chromatographed on 1 kg. of silica gel. The fractions eluted with 700 ml. each of 1:1-benzene+chloroform contain 8.49 grams of yellow, amorphous N-2:4-dinitrophenyl-cephalosporin C-di-para-nitro-phenyl ester of the formula

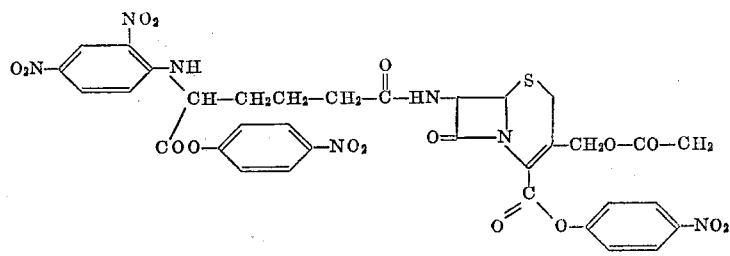

According to its thin-layer chromatogram on silica gel it is unitary; Rf=0.70 in the system chloroform+methanol 95:5. The yellow stain is sprinkled with 0.5 N-aqueous sodium hydroxide solution (allowing the alkali to act for 10 minutes), then with 2 N-aqueous acetic acid and then with iodine-starch solution (100 ml. of a solution of 1% strength of starch in water, mixed with 2 ml. of a solution of 1% iodine and 4% potassium iodide in water), whereupon it forms a light-colored spot on a violet background (modification of the method described by R. Thomas, in Nature 191 [4794], 1161 [1961]). The reaction is characteristic of penicillins and cephalosporins). In the form of a solution of 1% strength in acetone the substance reveals in the plate test no antibacterial activity towards *Staphylococcus aureus* and *Bacillus subtilis*. The infra-red spectrum in Nujol contains absorption bands, inter alia, at 5.63, 5.70, 5.85, 6.00, 6.16, 6.27, 6.56 and 7.44μ.

The compound may be hydrolyzed as follows:

200 mg. of N-2:4-dinitrophenyl-cephalosporin S-di-para-nitrophenyl ester are hydrolysed in 8 ml. of a 3:1-mixture of butanol and dioxane with 0.6 ml. of concentrated hydrochloric acid for 87 hours at 0° C. and then worked up as described in Example 1. According to its thin-layer chromatogram the ethyl acetate share contains only starting material (see below). The aqueous share is identified by paper-chromatography and the plate test (see Table 1). The compound of the type of 7-amino-cephalosporanic acid (stain w) contained in the aqueous phase differs distinctly from the stains p formed in each hydrolysis of the alkyl esters (identification in the case of the hydrolysis of N-2:4-dinitrophenyl-cephalosporin C-di-n-butyl ester as desacetyl-7-amino-cephalosporanic acid lactone). As revealed by its paper-electrophoresis at pH 4.5 (2000 volt, 1½ hours) the material of stain w is a mixture of 7-amino-cephalosporanic acid (path of migration towards the anode: 2.6 cm.) and a basic constituent (path of migration towards the cathode: 8.2 cm. which is probably 7-amino-cephalosporanic acid-para-nitrophenyl ester). Both constituents become bio-autographically (*Staphylococcus aureus*) visible only after phenyl-acetylation.

Example 11

6.47 grams of tertiary butyloxycarbonyl-cephalosporin C (prepared as described in Example 1), 4.24 grams of para-nitrophenol and 8.56 grams of N:N'-dicyclohexyl carbodiimide are dissolved in 300 ml. of acetonitrile and the solution is kept for 17 hours at 22° C. in the dark under nitrogen. The precipitated dicyclohexyl urea (4.38 grams) is then filtered off and the filtrate is evaporated under vacuum. The excess dicyclohexyl carbodiimide is washed out by triturating the evaporation residue three times with 100 ml. of petroleum ether on each occasion, 2.94 g., and the insoluble product is filtered off. The material is then dissolved in acetone, whereupon another 0.19 gram of dicyclohexyl urea is isolated. The filtrate is evaporated, the residue taken up in chloroform and exhaustively extracted with 0.5-molar phosphate buffer (pH 7.0), the extracts are washed with saturated sodium chloride solution, dried with sodium sulfate and the organic phase is evaporated, to yield 9.92 grams of crude tertiary butyloxycarbonyl - cephalosporin C-di-para-nitro-phenyl ester in the form of yellowish crystals from chloroform+ether 1:4, which melt at 104–106° C. after recrystallisation. According to its thin-layer chromatogram (on silica gel) the substance is unitary. In the system chloroform-methanol 95:5 the Rf=0.79, and in cyclohexane-ethyl acetate 1:1 the Rf=0.19. Yellow stains with sodium hydroxide solution, colorless stains with iodine-starch reagent (see Example 10).

Combustion analysis. — $C_{33}H_{35}O_{14}N_5S$: Molecular weight 757.75. Calculated: C, 52.31; H, 4.66; N, 9.24; S, 4.23%. Found: C, 52.59; H, 4.66; N, 9.14; S, 4.20%.

Figure 2:
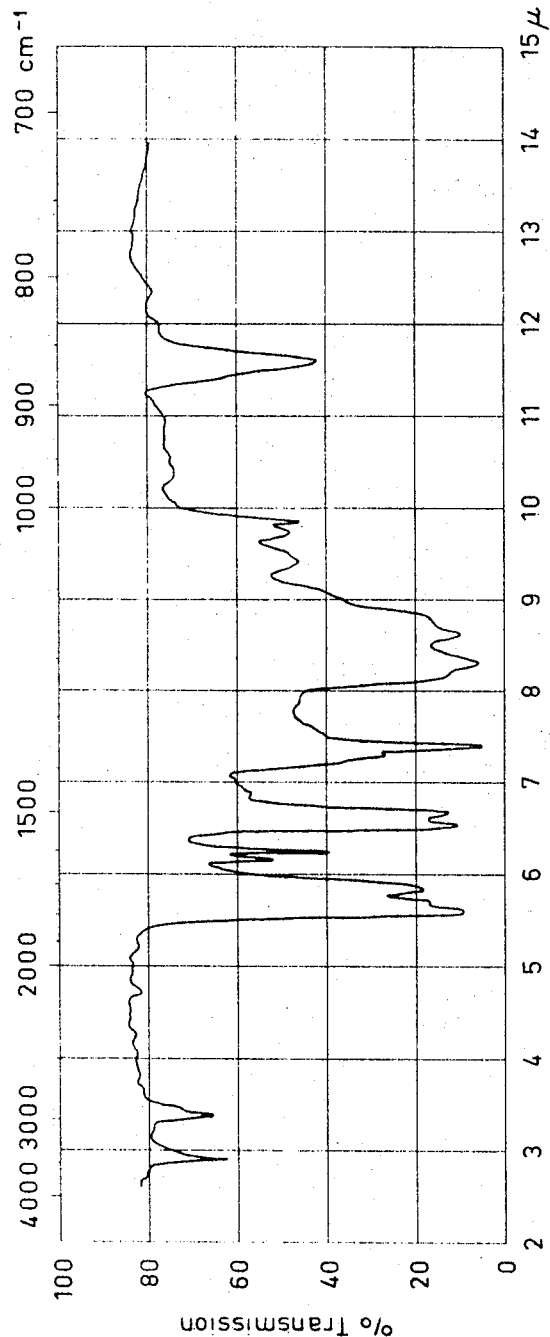

The infra-red absorption spectrum in methylene chloride contains bands, inter alia, at 5.62, 5.71, 5.83, 6.17, 6.26, 6.55, 6.94 and 7.41μ (see FIG 2).

Ultra-violet absorption spectrum in absolute alcohol: $\lambda_{max}$. 266 mμ ($\epsilon$=22,200). A solution of 1% strength of the substance proves biologically inactive in the plate test (*Staphylococcus aureus, Bacillus subtilis*).

The compound may be hydrolysed in a manner analogous to that described in Example 10.

Example 12

11.63 grams of N-2:4-dinitrophenyl-cephalosporin C are dissolved in 125 cc. of dioxane and treated at 22° C. with stirring for 25 minutes with 250 cc. of a 2% solution of phenyldiazomethane in ether. After the addition is complete, the reaction mixture is allowed to stand for 20 minutes and then extensively evaporated under reduced pressure. The residue is then taken up in chloroform and washed three times with 2 N-hydrochloric acid, N-sodium bicarbonate and water each time. The organic phase is dried and evaporated to yield 15.54 grams of crude product. By trituration with ether, the constituents soluble in ether (2.42 grams) are removed. The constituents which are not soluble in ether (12.84 grams) yield, when crystallized from a mixture of acetone and ether, 9.98 grams of crystalline N-2:4-dinitrophenyl-cephalosporin C dibenzyl ester of the formula

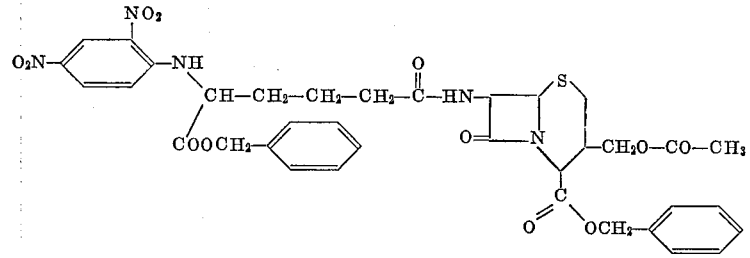

After recrystallization the product melts at 109–111° C.; optical rotation $[\alpha]_D^{25°}$=+31.5°±1° (c.=1 in chloroform).

$C_{36}H_{35}O_{12}N_5S$: Molecular weight 761.76. Calculated: C, 56.76; H, 4.63; N, 9.19; S, 4.21%. Found: C, 56.92; H, 4.60; N, 9.40; S, 4.19%.

Figure 3:
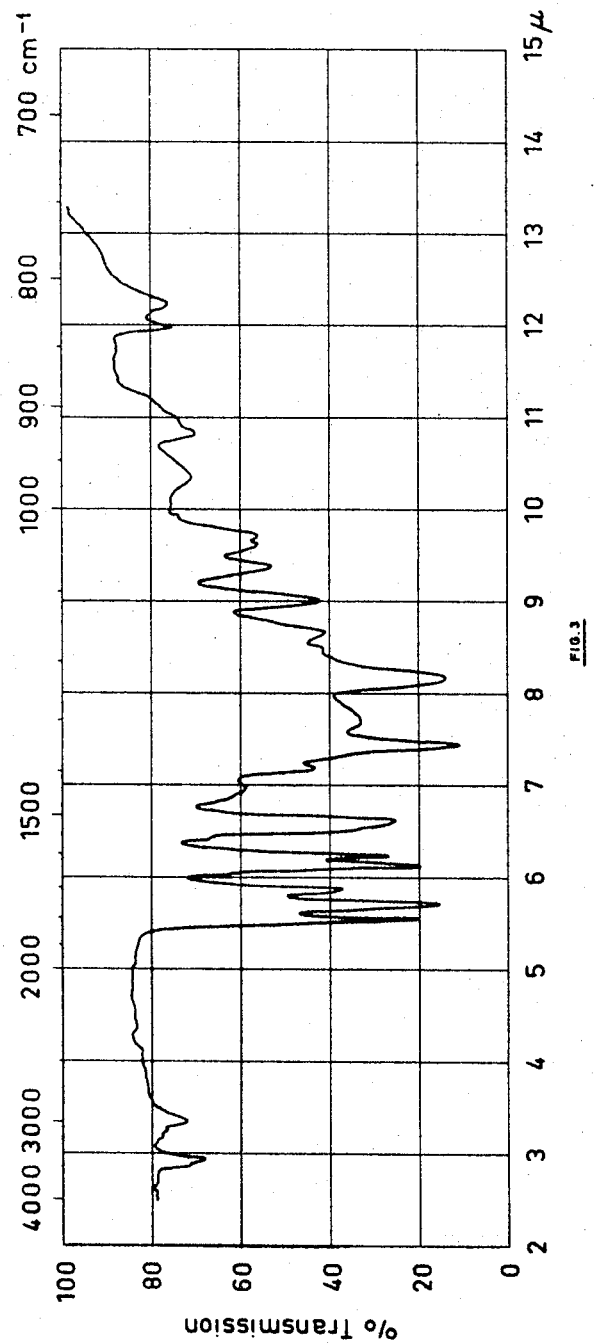

The infrared absorption spectrum in methylene chloride shows bands, inter alia, at 2.87; 2.94; 5.56; 5.72; 5.89; 6.15; 6.25; 6.63 and 7.45 mμ (see FIG. 3).

A 1% solution of the ester in acetone is biologically inactive in the plate test (*Staph. aureus, Bac. subtilis*).

The dibenzyl ester may be hydrolysed in a manner analogous to that described in the preceding examples.

Example 13

1.163 grams of N-2.4-dinitrophenyl-cephalosporin C are dissolved in 15 cc. of absolute dimethyl Cellosolve (ethyleneglycol-dimethyl ether) and treated with 0.685 gram (0.48 ml.) of freshly distilled benzyl bromide and 0.742 gram (0.955 ml.) of absolute tributyl-amine. The clear solution is heated in a dry current of nitrogen for 3 hours under reflux. The reaction solution cooled to room temperature is evaporated under reduced pressure to a syrupy consistency, taken up in 45 cc. of methylene chloride, washed twice with 15 cc. of ice-cold 2 N-hydrochloric acid, four times with 20 cc. of ice-cold sodium bicarbonate solution of 2% strength and finally with water. The sodium bicarbonate extracts are acidified to pH 2 with 4 N-hydrochloric acid, saturated with sodium chloride and extracted several times with ethyl acetate, 30 mg. of starting material being extracted. The methylene chloride layer is dried with sodium sulfate, evaporated under reduced pressure to yield 1.416 grams of neutral substances. The latter when subjected to thin-layer chromatography on silica gel with benzene-acetone 8:2 as eluant are found to consist of a mixture of the dibenzyl ester described in the preceding example and of an isomeric dibenzyl ester. The latter preponderates. The isoester probably differs from the ordinary ester by another configuration at the δ-C atom of the amino-adipic acid side-chain. By repeated fractional crystallization from a mixture of acetone and petroleum ether there is obtained 0.822 gram of pure dibenzyl isoester melting at 149–151° C.; optical rotation $[\alpha]_D^{25} = +229°$ (c.=0.8 in chloroform).

$C_{36}H_{35}O_{12}N_5S$: Molecular weight, 761.76. Calculated: C, 56.76; H, 4.63; O, 25.20; N, 9.19; S, 4.21%. Found: C, 57.09; H, 4.77; O, 24.95; N, 9.04; S, 4.15%.

Figure 4:
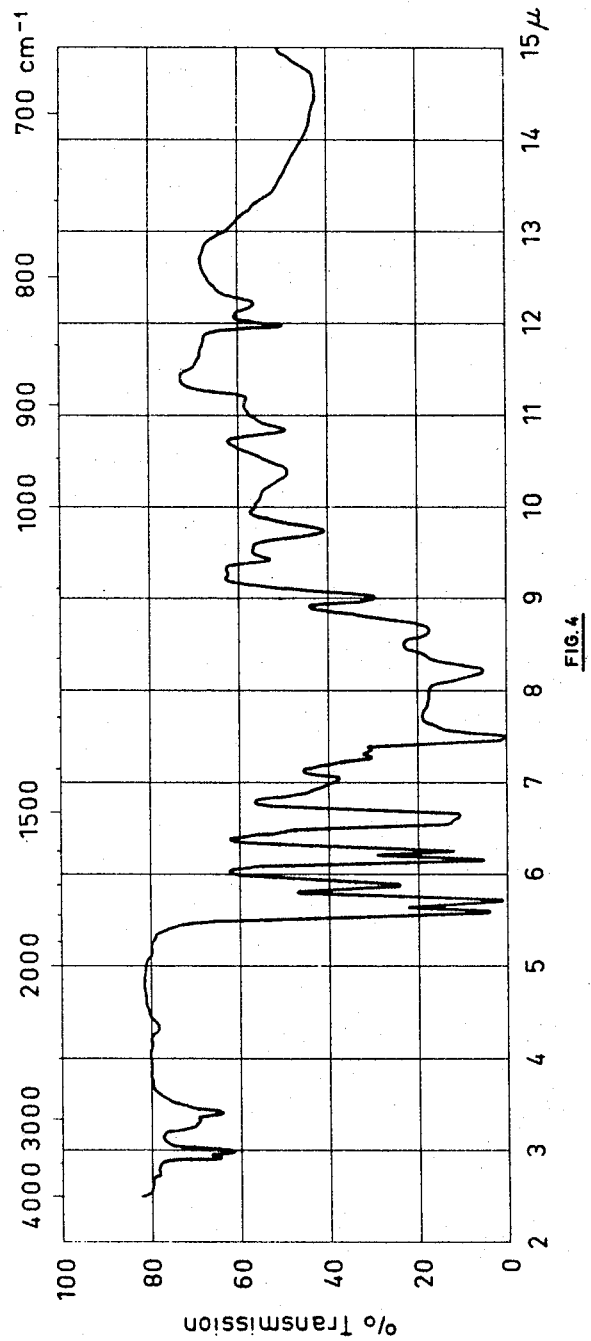

The infrared absorption spectrum in methylene chloride shows bands, inter alia, at 2.93; 3.00; 5.61; 5.90; 6.17; 6.26; 6.58; 6.65; 7.48 7.50 and 8.53 mμ, cf. FIG. 4.

A 1% solution of the ester in acetone is biologically inactive in the plate test. (*Staph. aureus, Bac. subtilis*).

The mother liquors of the fractional crystallization contain the dibenzyl ester with unchanged configuration in the enriched form.

Significance of abbreviations in the following table:

Pa=Phenylacetyl chloride reagent
Me=methyl
Et=ethyl
Bu=n-butyl
SA=*Staphylococcus aureus*
EC=*Escherichia coli*
BS=*Bacillus subtilis*
SA*=*Staphylococcus aureus* resistant to penicillin
System 1: n-butanol+acetic acid 10:1, saturated with water
System 2: n-butanol saturated with water and mixed with 1% of glacial acetic acid

TABLE 1.—IDENTIFICATION OF THE PRODUCTS OBTAINED

| | | Paper Chromatogram | | | | | | | Plate Test | | | | | | |
|---|---|---|---|---|---|---|---|---|---|---|---|---|---|---|---|
| | | Without phenylacetylchloride (Pa) | | | Bioautogram SA | | With Pa | | Inhibition zones in mm. of 1% solutions (6 mm. roundels) | | | | | | |
| | | Ninhydrin-collidine System 1 | | | | | | | Without Pa | | | | With Pa | | |
| Example | Substance | Spot | Rf | Color | Syst. 1 Rf | Syst. 2 Rf | Syst. 1 Rf | Syst. 2 Rf | SA | EC | BS | SA* | SA | EC | BS | SA* |
| | Cephalosporin C | a | 0.02 | Blue violet | 0.02 | 0.00 | 0.02 | 0.00 | 18 | 17 | 35 | 16 | 20 | | | |
| 1 | N-tert.butyloxycarbonyl-Cephalosporin C | b | | Negat | 0.80 | 0.51 | 0.79 | 0.51 | 19 | 0 | 32 | 17 | | | | |
| 1 | N-tert.butyloxycarbonyl-Cephalosporin C dimethyl ester | c | | Negat. | 0.89 | 0.84 | 0.88 | 0.84 | 16 | 0 | 19 | 9 | | | | |
| 1a | Ethyl acetate share | c | | Blue | 0.87 | | 0.88 | | 26 | 0 | 21 | 21 | | | | |
| | | o | (0.08) | Brown | Negat. | | Negat. | | | | | | | | | |
| | Water share | p | (0.13) | do | (0.15) | | 0.14 | | 14 | 0 | 18 | 13 | 22 | 0 | 20 | 16 |
| | | q | 0.21 | Blue | Negat. | | Negat. | | | | | | | | | |
| | | r | 0.36 | do | Negat. | | Negat. | | | | | | | | | |
| | | s | 0.54 | do | Negat. | | Negat. | | | | | | | | | |
| 1b | Ethyl acetate share | c | (0.87) | Blue | 0.86 | | 0.85 | | 10 | 0 | 14 | 11 | | | | |
| | Water share | p | (0.19) | Blue | Negat. | | (0.15) | | 6.5 | 0 | 14 | 8 | 13 | 0 | 17 | 12 |
| | | q | 0.56 | do | Negat. | | Negat. | | | | | | | | | |
| 1 | N-tert.butyloxycarbonyl-Cephalosporin C: | | | | | | | | | | | | | | | |
| 2 | dl-Et-ester | d | | Negat | 0.91 | 0.70 | 0.91 | 0.69 | 16 | 0 | 12 | 12 | | | | |
| 3 | dl-Bu-ester | o | | Negat | | | | | 17 | 0 | 22 | 13 | | | | |

3,454,564

TABLE 1—Continued

| | | | | Paper Chromatogram | | Bioautogram SA | | | Plate Test | | | | | | | |
|---|---|---|---|---|---|---|---|---|---|---|---|---|---|---|---|---|
| | | | | Without phenylacetylchloride (Pa) | | | With Pa | | Inhibition zones in mm. of 1% solutions (6 mm. roundles) | | | | | | | |
| | | | | Ninhydrin-collidine System 1 | | | | | Without Pa | | | | With Pa | | | |
| Example | Substance | Spot | Rf | Color | Syst. 1 Rf | Syst. 2 Rf | Syst. 1 Rf | Syst. 2 Rf | SA | EC | BS | SA* | SA | EC | BS | SA* |
| 1 | 2 | 3 | 4 | 5 | 6 | 7 | 8 | 9 | 10 | 11 | 12 | 13 | 14 | 15 | 16 | |
| | N-2:4-dinitrophenyl-Cephalosporin C | f | 0.73 | Natural | 0.73 | 0.76 | 0.74 | 0.75 | 21 | 0 | 28 | 16 | | | | |
| 4 | N-2:4-dinitrophenyl-Cephalosporin C-di-Me-ester | g | 0.73 | Natural | 0.73 | | 0.74 | | 19 | 0 | 20 | 10 | | | | |
| 4a | Ethyl acetate share | g | 0.73 | do | 0.74 | | 0.74 | | | | | | | | | |
| | Water share | p | 0.11 | Brown | Negat. | | 0.12 | | 13 | 0 | 11 | 13 | 30 | 7 | 32 | 24 |
| | | t | 0.23 | Orange | 0.80 | | 0.78 | | | | | | | | | |
| 4b | Ethyl acetate share | g | 0.87 | Natural | Negat. | | 0.13 | | 18 | | 16 | 10 | | | | 15 |
| | Water share | p | 0.12 | Brown | Negat. | | Negat. | | 0 | | 0 | 0 | 27 | | 27 | |
| | | t | 0.23 | Orange | 0.80 | | 0.79 | | | | | | | | | |
| 4c | Ethyl acetate share | g | 0.88 | Natural | 0.80 | | 0.79 | | 16 | | 14 | 8 | | | | 16 |
| | Water share | p | 0.13 | Brown | Negat. | | 0.14 | | 0 | | 0 | 0 | 24 | | 24 | |
| | | t | 0.24 | Orange | Negat. | | Negat. | | | | | | | | | |
| 4d | Ethyl acetate share | g | 0.87 | Natural | Negat. | | Negat. | | 20 | | 18 | 11 | | | | 20 |
| | Water share | p | 0.14 | Brown | | | | | 7 | | 0 | 8 | 20 | | 21 | |
| | | (0.30) | Grey | | | | | | | | | | | | | |
| | | t | 0.26 | Orange | | | | | | | | | | | | |
| 4e | Ethyl acetate share | g | 0.89 | Natural | | | | | 9 | | 0 | 0 | | | | 16 |
| | Water share | p | 0.14 | Brown | | | | | 0 | 0 | | | 25 | | 26 | |
| | | (0.18) | Grey | | | | | | | | | | | | | |
| | | t | 0.25 | Orange | | | | | | | | | | | | |
| 5 | N-2:4-dinitrophenyl-Cephalosporin C-di-Et-ester | h | 0.80 | Natural | 0.78 | | 0.79 | | 20 | 0 | 15 | 10 | | | | |
| 5a | Ethyl acetate share | h | 0.84 | do | 0.79 | | 0.08 | | | | | | | | | 23 |
| | Water share | p | 0.13 | Brown | Negat. | | 0.15 | | 9 | 0 | 8 | 10 | 28 | 0 | 32 | |
| | | ((0.24)) | Orange | | | | | | | | | | | | | |
| | | t | 0.91 | Natural | 0.88 | | 0.82 | | 18 | | 16 | 10 | | | | 12 |
| 5b | Ethyl acetate share | h | 0.13 | Brown | 0.13 | | 0.15 | | 8 | | 8 | 7 | 23 | | 22 | |
| | Water share | p | ((0.25)) | Orange | Negat. | | 0.81 | | 18 | | 15 | 9 | | | | 3 |
| | | t | 0.91 | Natural | 0.82 | Negat. | 0.13 | | 9 | | 7 | 7 | 23 | | 15 | 13 |
| 5c | Ethyl acetate share | h | 0.14 | Brown | Negat. | | Negat. | | 20 | | 16 | 11 | | | | |
| | Water share | p | (0.25) | Orange | Negat. | | | | 11 | | 9 | 11 | 28 | | 29 | 19 |
| | | t | 0.90 | Natural | | | | | | | | | | | | |
| 5d | Ethyl acetate share | h | 0.16 | Brown | | | | | 16 | | 12 | 10 | | | | 19 |
| | Water share | p | ((0.27)) | Orange | | | | | 8 | | 7 | 9 | 28 | | 28 | |
| | | t | 0.93 | Natural | | | | | | | | | | | | |
| 5e | Ethyl acetate share | h | 0.14 | Brown | | | | | | | | | | | | |
| | Water share | p | (0.18) | Grey | | | | | | | | | | | | |
| | | t | 0.24 | Orange | | | | | | | | | | | | |
| 6 | N-2:4-dinitrophenyl-Cephalosporin C-di-Bu-ester | i | 0.85 | Natural | 0.82 | 0.85 | 0.83 | 0.87 | 19 | 0 | 26 | 14 | | | | |
| 6a | Ethyl acetate share | i | 0.91 | do | 0.83 | | 0.86 | | 12 | 0 | 11 | 14 | 23 | 7 | 23 | 19 |
| | Water share | p | 0.14 | Brown | Negat. | | 0.16 | | | | | | | | | |
| | | (0.72) | Blue | Negat. | | Negat. | | | | | | | | | | |
| 7 | N-phenylacetyl-Cephalosporin C | k | | Negat | 0.75 | | 0.73 | | 20 | 0 | 31 | 19 | | | | |
| | di-Me-ester | l | | Negat | | 0.76 | 0.75 | | 19 | 0 | 19 | 16 | | | | |
| | di-Et-ester | m | | Negat | 0.85 | | 0.82 | 0.85 | 15 | 0 | 7 | 12 | | | | |
| | di-Bu-ester | n | | Negat | | 0.87 | | | 20 | | 23 | 17 | | | | |
| 10 | Ethyl acetate share | | | | | | | | 7 | | 7 | 0 | | | | |
| | Water share | w | 0.29 | Grey | Negat | 0.28 | | | 0 | | 0 | 0 | 21 | | 24 | 18 |

What is claimed is:

1. N-tertiary butyloxycarbonyl-cephalosporin C-di-lower alkyl ester.
2. N-tertiary butyloxycarbonyl-cephalosporin C-di-benzyl ester.
3. N-tertiary butyloxycarbonyl-cephalosporin C.
4. A member selected from the group consisting of

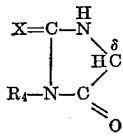

7 - [4-(1-phenyl-2-thiono-5-oxo-imidazolidine-4-yl) - butyryl]-amino-cephalosporanic acid and its therapeutically acceptable salts.
5. Cephalosporin C-di-benzylester.
6. N-phenylacetyl-cephalosporin C-mono methylester-desacetyl-lactone.
7. N-2:4-diamino phenyl-cephalosporin C-di-n-butyl ester.
8. N-tertiary butyloxycarbonyl-cephalosporin C-diaryl ester derived from a member selected from the group consisting of phenol and nitrophenol.
9. N-2:4-dinitrophenyl-cephalosporin C diester, said diester being derived from a member selected from the group consisting of lower alkanol, phenyl-lower alkanol and nitrophenyl-lower alkanol.
10. N-phenylacetyl-cephalosporin C diester, said diester being derived from a member selected from the group consisting of lower alkanol, phenyl-lower alkanol and nitrophenyl-lower alkanol.
11. Esters of 7-[4-(1-phenyl-2-thiono-5-oxo-imidazolidine-4-yl)-butyryl]-amino-cephalosporanic acid derived from a member selected from the group consisting of lower alkanol, phenyl-lower alkanol and nitrophenyl-lower alkanol.
12. A member selected from the group consisting of a compound of the formula

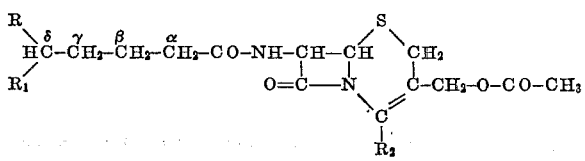

in which R represents a member selected from the group consisting of an —NH₂ group and an —NHR₃ group, wherein R₃ is a member selected from the group consisting of phenyl, aminophenyl, nitrophenylcarbonyl, aminophenylcarbonyl, phenylacetyl and tertiary butoxycarbonyl, said phenyl substituents being substituted by not more than two substituents selected from the group consisting of amino and nitro, and R₁ and R₂ each represents a carboxyl group esterified with an alcohol selected from the group consisting of lower alkanol, phenyl-lower alkanol and nitrophenyl-lower alkanol.
13. A member selected from the group consisting of a lactone of the formula

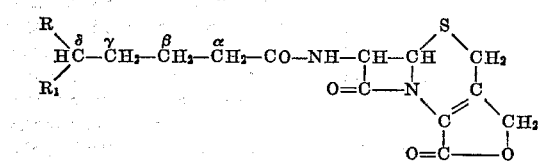

in which R represents a member selected from the group consisting of an —NH₂ group and an —NHR₃ group, wherein R₃ is a member selected from the group consisting of phenyl, nitrophenyl, aminophenyl, nitrophenylcarbonyl, aminophenylcarbonyl, phenylacetyl and tertiary butoxycarbonyl, said phenyl substituents being substituted to not more than two substituents selected from the group consisting of amino and nitro and R₁ represents a carboxyl group esterified with an alcohol selected from the group consisting of lower alkanol, phenyl-lower alkanol and nitrophenyl-lower alkanol, and a therapeutically acceptable acid addition salt thereof.
14. A member selected from the group consisting of a compound of the formula

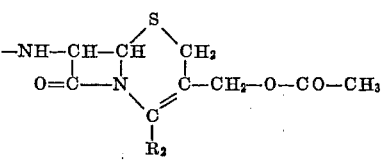

in which R₂ represents a carboxyl group esterified with an alcohol selected from the group consisting of lower alkanol, phenyl-lower alkanol and nitrophenyl-lower alkanol, R₄ is a member selected from the group consisting of hydrogen, lower alkanoyl, lower alkyl, phenyl, nitrophenyl, aminophenyl and halophenyl, said phenyl substituents being substituted by not more than two members selected from the group consisting of nitro, amino and halo, and X is a member selected from the group consisting of oxygen and sulfur, and a therapeutically acceptable acid addition salt thereof.
15. A member selected from the group consisting of a lactone of the formula

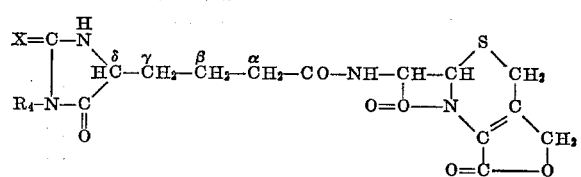

in which R₄ is a member selected from the group consisting of hydrogen, lower alkanoyl, lower alkyl, phenyl, nitrophenyl, aminophenyl and halophenyl, said phenyl substituents being substituted by not more than two members selected from the group consisting of nitro, amino and halo, and X is a member selected from the group consisting of oxygen and sulfur, and a therapeutically acceptable acid addition salt thereof.
16. A process for the manufacture of 7-[4-(1-phenyl-2-thiono-5-oxo-imidazalidine-4-yl)-butyryl] - amino-cephalosporanic acid, wherein cephalosporin C is treated in a weakly alkaline medium with phenylisothiocyanate to form N-(N'-phenyl-thiocarbamyl)-cephalosporin C and the latter is treated in a weakly acidic medium to effect ring closure.
17. The compound of the formula

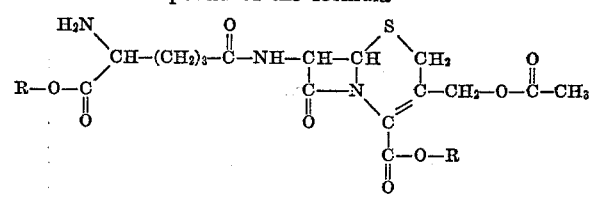

wherein R is alkyl.

References Cited

UNITED STATES PATENTS 3,124,576  3/1964  Stedman _____ 260—243
3,160,631  12/1964  Peterson et al. _____ 260—243
3,167,549  1/1965  Hoover et al. _____ 260—243

OTHER REFERENCES

Jeffrey Biochemical Jour., vol. 81, pp. 591–595 (1961).

NICHOLAS S. RIZZO, *Primary Examiner.*

U.S. Cl. X.R.

424—246